US011572201B2

(12) United States Patent
Hay et al.

(10) Patent No.: US 11,572,201 B2
(45) Date of Patent: *Feb. 7, 2023

(54) ACTUATED RESETTABLE SHOCKLESS HOLD DOWN AND RELEASE MECHANISM (ARES HDRM)

(71) Applicant: MACDONALD, DETTWILER AND ASSOCIATES INC., Brampton (CA)

(72) Inventors: Gavin Hay, Toronto (CA); Gregg G. Bull, Ballinafad (CA)

(73) Assignee: MACDONALD, DETTWILER AND ASSOCIATES INC., Brampton (CA)

(*) Notice: Subject to any disclaimer, the term of this patent is extended or adjusted under 35 U.S.C. 154(b) by 310 days.

This patent is subject to a terminal disclaimer.

(21) Appl. No.: 17/012,161

(22) Filed: Sep. 4, 2020

(65) Prior Publication Data

US 2021/0130013 A1    May 6, 2021

Related U.S. Application Data

(63) Continuation of application No. 15/849,225, filed on Dec. 20, 2017, now Pat. No. 10,766,639.

(60) Provisional application No. 62/437,179, filed on Dec. 21, 2016.

(51) Int. Cl.
 *B64G 1/64* (2006.01)
 *B64G 1/22* (2006.01)
(52) U.S. Cl.
 CPC .............. *B64G 1/641* (2013.01); *B64G 1/222* (2013.01)
(58) Field of Classification Search
 CPC ................................ B64G 1/641; B64G 1/222

USPC ..................................................... 244/173.3
See application file for complete search history.

(56) References Cited

U.S. PATENT DOCUMENTS

| 4,679,752 A | 7/1987 | Wittmann et al. |
| 4,998,842 A | 3/1991 | Sheridan |
| 5,002,418 A | 3/1991 | McCown |
| 5,125,601 A | 6/1992 | Monford, Jr. |
| 5,439,310 A | 8/1995 | Evenson et al. |
| 6,138,951 A | 10/2000 | Budris et al. |
| 6,203,237 B1 | 3/2001 | Swift et al. |
| 10,062,537 B1 | 8/2018 | Vega |
| 10,377,510 B1 | 8/2019 | Riskas et al. |
| 2003/0076215 A1 | 4/2003 | Baghdasarian |
| 2010/0008611 A1 | 1/2010 | Weimer |
| 2011/0113605 A1 | 5/2011 | Plaza Baonza |
| 2012/0076614 A1 | 3/2012 | Baghdasarian |

(Continued)

FOREIGN PATENT DOCUMENTS

| CN | 103231813 A | 8/2013 |
| DE | 3106099 A1 | 10/1982 |

(Continued)

OTHER PUBLICATIONS

International Search Report for PCT/CA2017/051560, dated Apr. 16, 2018, 3 Pages.

(Continued)

*Primary Examiner* — Christopher P Ellis
(74) *Attorney, Agent, or Firm* — Hill & Schumacher

(57) ABSTRACT

The present disclosure relates to a mechanism for releasably securing components of a spacecraft together during launch until such time as the mechanism is commanded to release those components. Upon command, the components are then released with extremely low shock forces being transmitted to the previously secured components due to the release.

24 Claims, 12 Drawing Sheets

(56) References Cited

U.S. PATENT DOCUMENTS

| | | |
|---|---|---|
| 2013/0249229 A1 | 9/2013 | Roberts et al. |
| 2015/0329224 A1 | 11/2015 | Sachdev et al. |
| 2018/0072434 A1 | 3/2018 | Novotney et al. |
| 2019/0144138 A1 | 5/2019 | Spark |

FOREIGN PATENT DOCUMENTS

| | | |
|---|---|---|
| EP | 0151505 A1 | 8/1985 |
| EP | 1191271 A2 | 3/2002 |
| EP | 2213572 A1 | 8/2010 |
| EP | 3351477 A1 | 1/2018 |
| EP | 3438003 A1 | 2/2019 |
| JP | 763245 A | 3/1995 |
| JP | 2006-193019 A | 7/2006 |
| JP | 2014-113938 A | 6/2014 |
| WO | 2008109993 A1 | 9/2008 |

OTHER PUBLICATIONS

International Written Opinion for PCT/CA2017/051560, dated Apr. 16, 2018, 5 Pages.

ACTUATED RESETTABLE SHOCKLESS HOLD DOWN AND RELEASE MECHANISM (ARES HDRM)

FIELD

The present disclosure relates to a resettable mechanism for releasably securing components of a spacecraft together during launch until such time as the mechanism is commanded to release those components. Upon command, the components are then released with extremely low shock forces being transmitted to the previously secured components due to the release.

BACKGROUND

The launch of any spacecraft induces significant loads on the bus structure and all elements attached in addition to the forces that actually accelerate the payload into space. These include acoustic pressures, random vibrations, lateral and torsional forces, usually acting in combination and of sufficient magnitude to be significant design drivers for the spacecraft and any of its subcomponents. Spacecraft components whose function requires them to move or be repositioned after launch, such as, but not limited to, antenna arrays, pointing mechanisms, solar arrays, deployable masts, etc., must also be secured in their designed launch configuration in order to withstand the launch loads listed above and then be capable of successful release once in orbit so that they may fulfil their functions successfully.

The devices that secure these movable components during launch are generically referred to as Hold Down and Release Mechanisms (HDRMs). As part of their function to secure the move able components, they also usually form a significant part of the structural integrity of the secured component providing a connection to the spacecraft body of known rigidity and strength and allowing the secured component to be designed around those known capabilities. Having HDRMs capable of withstanding varying forces and torques allows the movable components to be more efficiently designed, thus lowering the overall mass of the spacecraft and providing a significant benefit to the spacecraft owner/operator.

HDRMs of various types have been used since the very first spacecraft flights and, because they form a significant part of the spacecraft structure, the connection between the moveable component and the rest of the spacecraft is usually under considerable load, generally in the form of significant tension, termed "pre-load" within the primary load sharing component within the HDRM. Affecting the release of the movable component from the spacecraft body involves eliminating this tension connecting the two. Virtually all existing HDRM devices release this connecting tension extremely quickly, in small fractions of a second, resulting in significant mechanical shocks to both the spacecraft and the released component. For extremely fragile or delicate spacecraft subsystems these shocks can be debilitating, requiring mitigation techniques to limit the damage these shocks can cause. Generally, these mitigation techniques involve making structures more robust which in turn results in added mass and reduced spacecraft performance and or increased launch costs.

In addition, the vast majority of existing HDRMs have a consumable element to the design with some part being broken, or burned through as part of the release process. This, then, requires that after each release cycle, including the needed testing release cycles required to prove the overall spacecraft design prior to launch, that some part of the HDRM must be replaced. Further reducing confidence in the release that occurs after launch, is the fact that the part that is actually the most important has never actually been tested. It is impossible with these systems to actually test every portion of the mechanism that is launched prior to flight. At least one sub component of the HDRM is new and untested at the time of first (and often only) release in space.

Presently, there are no HDRM mechanisms which release secured movable spacecraft components, provide the structural connection between the spacecraft and the released component, release the component with near-zero shock and are fully resettable with no new consumable sub components required.

SUMMARY

The present disclosure relates to a mechanism that structurally and releasably secures two items together and that upon command releases the two items in a manner which does not impart a mechanical shock to either released item. The HDRM mechanism disclosed herein, referred to as the Actuated Resettable Shockless (AReS) HDRM, uses the principles of wedges to provide a structural, virtually shockless release mechanism that may be repeatedly reset and that has no consumable sub components.

An embodiment disclosed herein provides a mechanism for releasably securing otherwise movable components of a spacecraft to the non-movable body of that spacecraft. Using the principle of sliding wedges, the invention discloses how actuator driven interfacing wedges can provide not only the needed structural connection between two items, but how the structural connection, or pre-load, between the two parts can be released in a manner that does not impart mechanical shock loads to either part. In addition, the use of actuator-driven wedges does not require any of the components of the HDRM to be damaged, broken or consumed during any release operations. This means that the exact same components that are to be used for the actual space operational release of the preload can be tested prior to the operation, greatly increasing reliability and reducing risks for what is always a critical operation. Failure of the release can stop the satellite from ever becoming operational.

Inherent in the mechanism disclosed herein is the ability to reset the mechanism to the preloaded state after a release of the preload with no other action than to place the parts together physically, relying on an electrical powered function to drive the actuator to rotate in an opposite direction to that needed to release the preload. This not only provides significant benefits prior to the initial operational release of the mechanism, but permits operations where the items previously secured together may be secured together again, repeatedly, and with the same level of structural connection as prior to the initial release.

The present disclosure provides a system for positioning and mating together first and second objects which comprises a robotic arm with the first object being configured to be positioned by the robotic arm during operations to mate the first object to the second object. The system includes an active housing forming a first part of a resettable and shockless hold-down and release mechanism with the active housing having a distal end which includes an attachment feature attached to the first object. The active housing has a first interface, a locking mechanism mounted in the active housing which includes engagement members extending beyond the first interface. The active housing has one or more sensors mounted thereon. The system includes a passive housing forming a second part of the resettable and shockless hold-down and release mechanism with the passive housing having a distal end which includes an attachment feature attached to the second object. The passive housing includes a second interface complementary to the first interface to form a coupling between it and the first interface of the passive housing to give a structural connection between the active and passive housings. The passive housing is configured to receive therein the engagement members when a structural connection is formed between the active and passive housings. The passive housing includes an internal structure complementary to the engagement members and the locking mechanism includes a reversible drive mechanism which, upon establishment of the structural connection, is configured to drive the engagement members radially outwards into physical contact with the internal structure thereby locking the active and passive housing assemblies together in a shockless manner. Conversely, reversing the drive mechanism causes the engagement members to physically disengage from the complementary internal housing structure to release the active and passible housing assemblies from each other in a shockless manner. The system includes a control system connected to the robotic arm and the one or more sensors. The control system is programmed for controlling the robotic arm based on feedback from the one or more sensors for all activities associated with aligning, coupling and decoupling the active housing already attached to the second object with respect to the passive housing already attached to the first object.

The present disclosure provides a system for positioning and mating together first and second objects which comprises an active housing forming a first part of a resettable and shockless hold-down and release mechanism. The active housing includes a distal end which includes an attachment feature attached to the first object. The active housing includes a first interface and a locking mechanism mounted in the active housing which includes engagement members extending beyond the first interface. The active housing has one or more sensors mounted thereon. The system includes a robotic arm and the second object is configured to be positioned by the robotic arm during operations to mate the second object to the first object.

The system includes a passive housing forming a second part of the resettable and shockless hold-down and release mechanism which includes a distal end which includes an attachment feature attached to the second object. The passive housing has a second interface complementary to the first interface to form a coupling between it and the first interface of the passive housing to give a structural connection between the active and passive housings. The passive housing is configured to receive therein the engagement members when a structural connection is formed between the active and passive housings and the passive housing having an internal structure complementary to the engagement members. The locking mechanism includes a reversible drive mechanism which, upon establishment of the structural connection, is configured to drive the engagement members radially outwards into physical contact with the internal structure thereby locking the active and passive housing assemblies together in a shockless manner. Conversely, reversing the drive mechanism causes the engagement members to physically disengage from the complementary internal housing structure to release the active and passible housing assemblies from each other in a shockless manner. The passive housing has one or more sensors mounted thereon.

The system includes a control system connected to the robotic arm and the one or more sensors with the control system being programmed for controlling the robotic arm based on feedback from the one or more sensors for all activities associated with aligning, coupling and decoupling the passive housing already attached to the second object with respect to the active housing already attached to first object.

The present disclosure provides a system for positioning and mating together first and second objects and comprises a first robotic arm with the first object being configured to be positioned by the robotic arm during operations to mate the first object to the second object. The system includes an active housing forming a first part of a resettable and shockless hold-down and release mechanism and includes an active housing having a distal end that includes an attachment feature attached to the first object. The active housing has a first interface and a locking mechanism mounted in the active housing which includes engagement members extending beyond the first interface. The active housing has one or more sensors mounted thereon. The system includes a second robotic arm, and the second object is configured to be positioned by the second robotic arm during operations to mate the second object to the first object.

The system includes a passive housing forming a second part of the resettable and shockless hold-down and release mechanism mounted to the second robotic arm. The passive housing has a distal end which includes an attachment feature attached to the second object, the passive housing having a second interface complementary to the first interface to form a coupling between it and the first interface of the passive housing to give a structural connection between the active and passive housings. The passive housing is configured to receive therein the engagement members when a structural connection is formed between the active and passive housings. The passive housing includes an internal structure complementary to the engagement members. The locking mechanism includes a reversible drive mechanism which, upon establishment of the structural connection, is configured to drive the engagement members radially outwards into physical contact with the internal structure thereby locking the active and passive housing assemblies together in a shockless manner.

Conversely, reversing the drive mechanism causes the engagement members to physically disengage from the complementary internal housing structure to release the active and passible housing assemblies from each other in a shockless manner. The passive housing has one or more sensors mounted thereon.

The control system is connected to the first and second robotic arms and the one or more sensors on the passive and active housings. The control system is programmed for controlling the first and second robotic arms based on feedback from the one or more sensors on the passive and active housings for all activities associated with aligning, coupling and decoupling the active and passive housings.

The one or more sensors may be any one or combination of cameras, camera-based vision system, radars and LIDAR.

The control system may include a computer control system configured for autonomous control of the robotic arm by the computer control system.

The control system may be configured to receive human-in-the-loop commands from a remote location.

The remote location may be a ground station.

The first object may be a spacecraft payload and the second object may be a spacecraft.

The first object may be a spacecraft payload and the second object may be a spacecraft.

The control system may be configured for control of the positioning device by any one of an autonomous computer control system or human-in-the-loop command from a remote location by communication with a ground station, and sensor feedback associated with the robotic arm.

A further understanding of the functional and advantageous aspects of the disclosure can be realized by reference to the following detailed description and drawings.

BRIEF DESCRIPTION OF THE DRAWINGS

Embodiments of the mechanism for releasably securing components of a spacecraft together during launch will now be described, by way of example only, with reference to the drawings, in which.

DETAILED DESCRIPTION

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

The following is a description of the preferred embodiment of the AReS HDRM. Additional embodiments will also be described.

Figure 1:
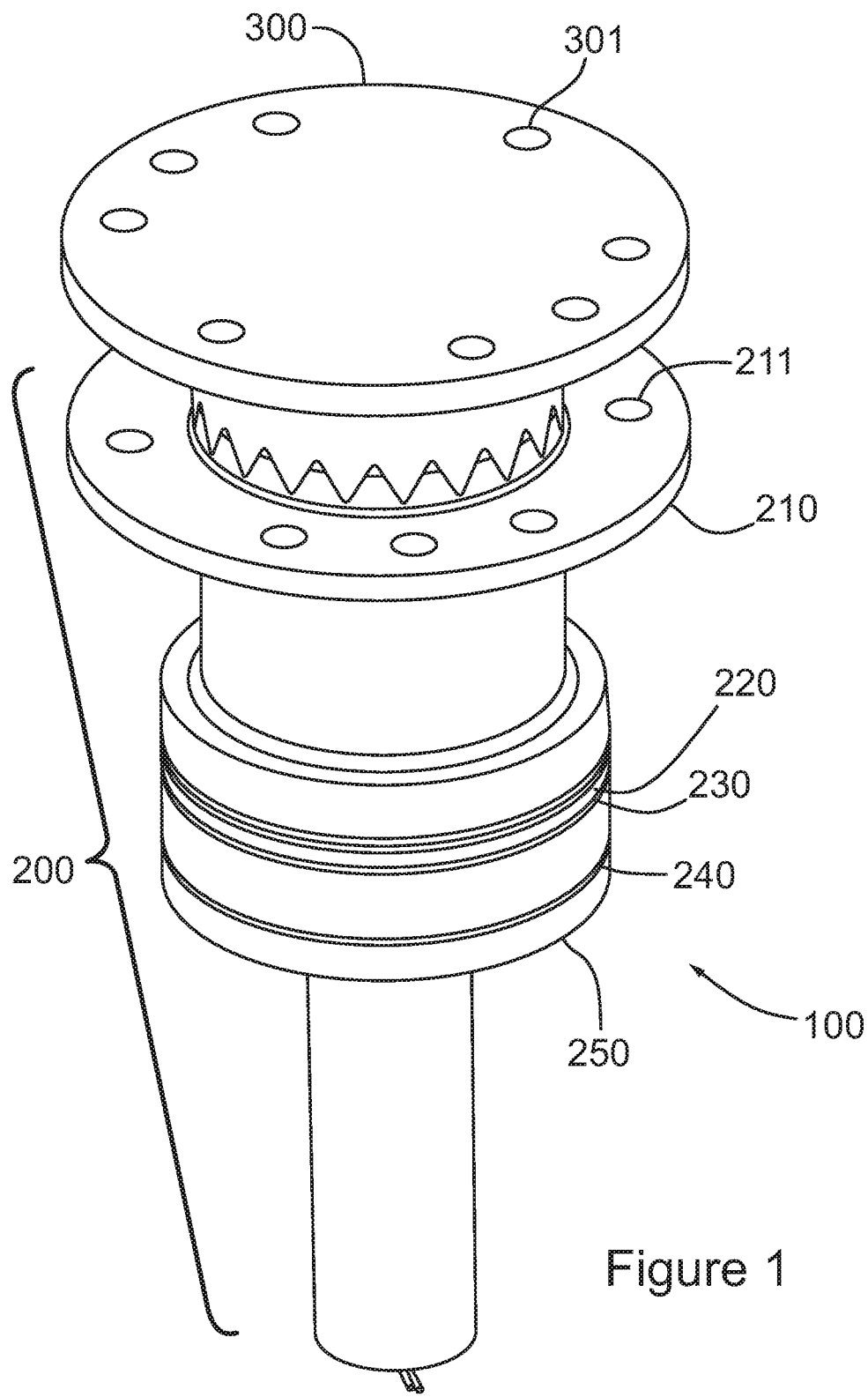
FIG. 1 is an isometric exterior view of an embodiment of an actuated resettable and shockless hold-down and release mechanism constructed in accordance with the present disclosure.
Figure 2:
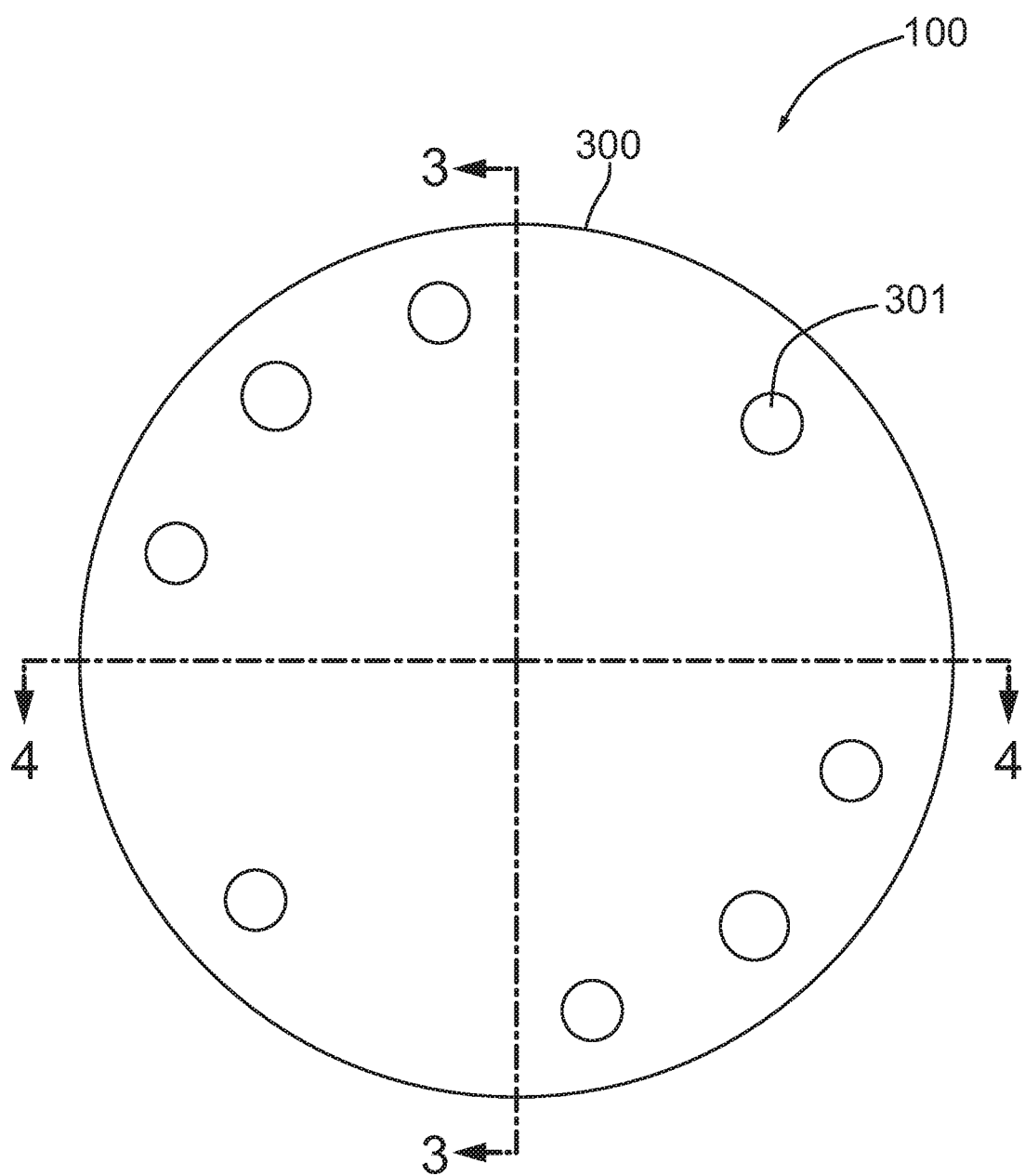
FIG. 2 is a top view of the mechanism of FIG. 1 taken along arrow 2 of FIG. 1.

FIG. 1 shows an isometric exterior view of the AReS HDRM 100 showing the passive housing 300, the active housing assembly 200 and mounting holes 301 and 211. The active housing assembly 200 components visible include the active housing 210, preload shim 220, collet 230, bearing housing 240 and actuator assembly 250. FIG. 2 shows a top view of the AReS HDRM 100.

Figure 3:
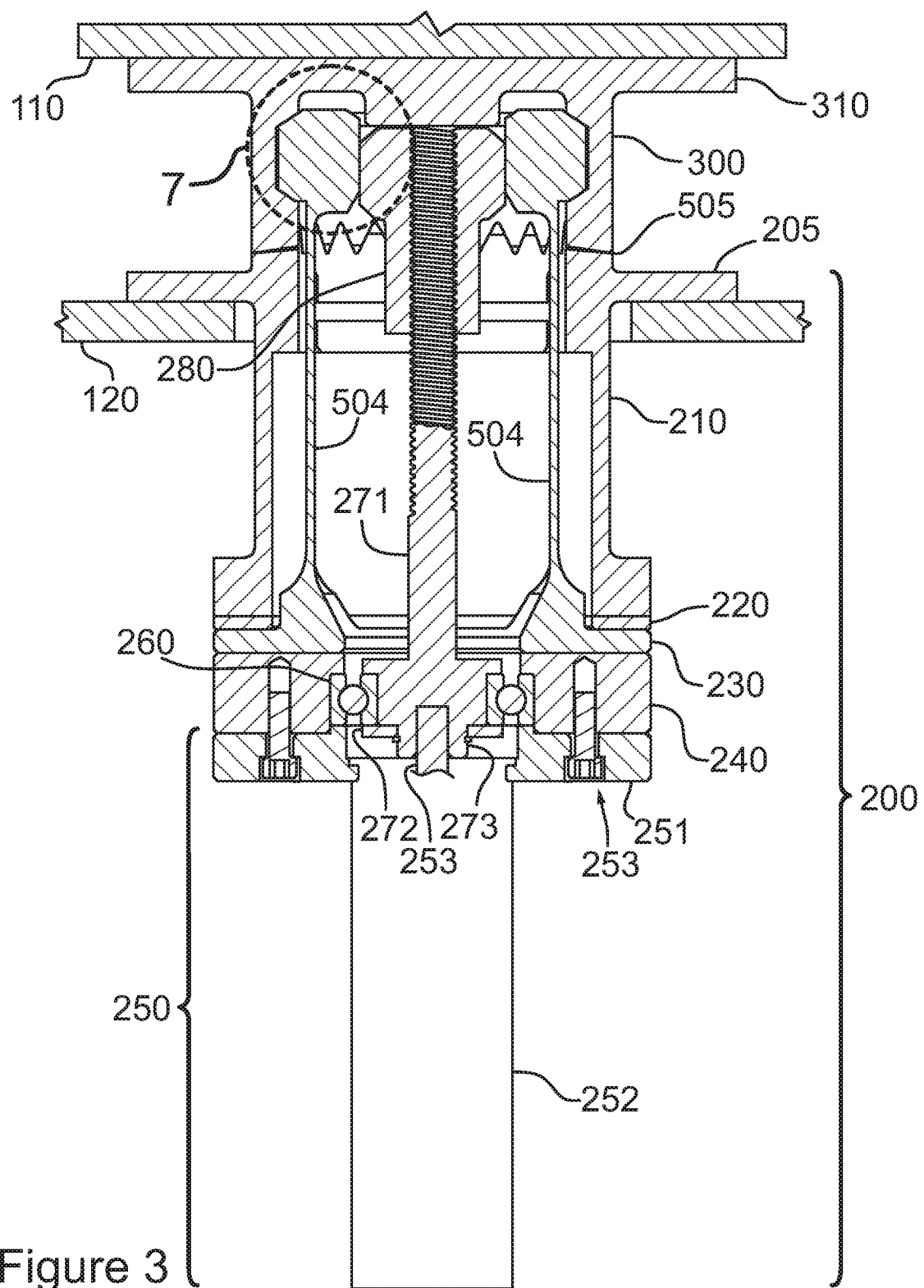
FIG. 3 is a cross section view taken along line 3-3 of FIG. 2 showing the internal structure of the mechanism.

FIG. 3 shows a cross section view taken along line 3-3 of FIG. 2 showing further details of the passive housing 300 and the active housing assembly 200. It also shows how the two objects, 110 and 120 are connected by the AReS HDRM 100 (see FIG. 1). The active housing 200 assembly components visible include the active housing 210, preload shim 220, collet 230, bearing housing 240, actuator assembly 250, bearing 260, lead screw 271, bearing washer 272, fasteners 253, bearing retainer 273 and plunger 280. Actuator assembly 250 comprises actuator plate 251, and actuator 252. This figure also shows the passive housing 300 attached to its object 110 via attachment feature 310 and the active housing 210 attached to its object 120 via attachment feature 205. In one proposed use of the AReS, object 110 is a payload which is releasably and resettabley secured to object 120 which is a spacecraft. In an alternate application of the AReS, the object 110 is a spacecraft and object 120 is a payload which can be connected with the AReS in a releasable and resettable manner. Object 110 can be connected to passive housing 300 at attachment feature 310 with one of a variety of methods such as discrete fasteners (bolts), threaded interfaces, welding, integral machining, etc. Similarly, object 120 can be connected to active housing 210 at attachment feature 205 with one of the same variety of fastening technologies.

It is noted that the attachment feature may be an annular flange having holes extending therethrough which match corresponding holes in an attachment feature on the object (s) to which it is being attached.

Figure 4:
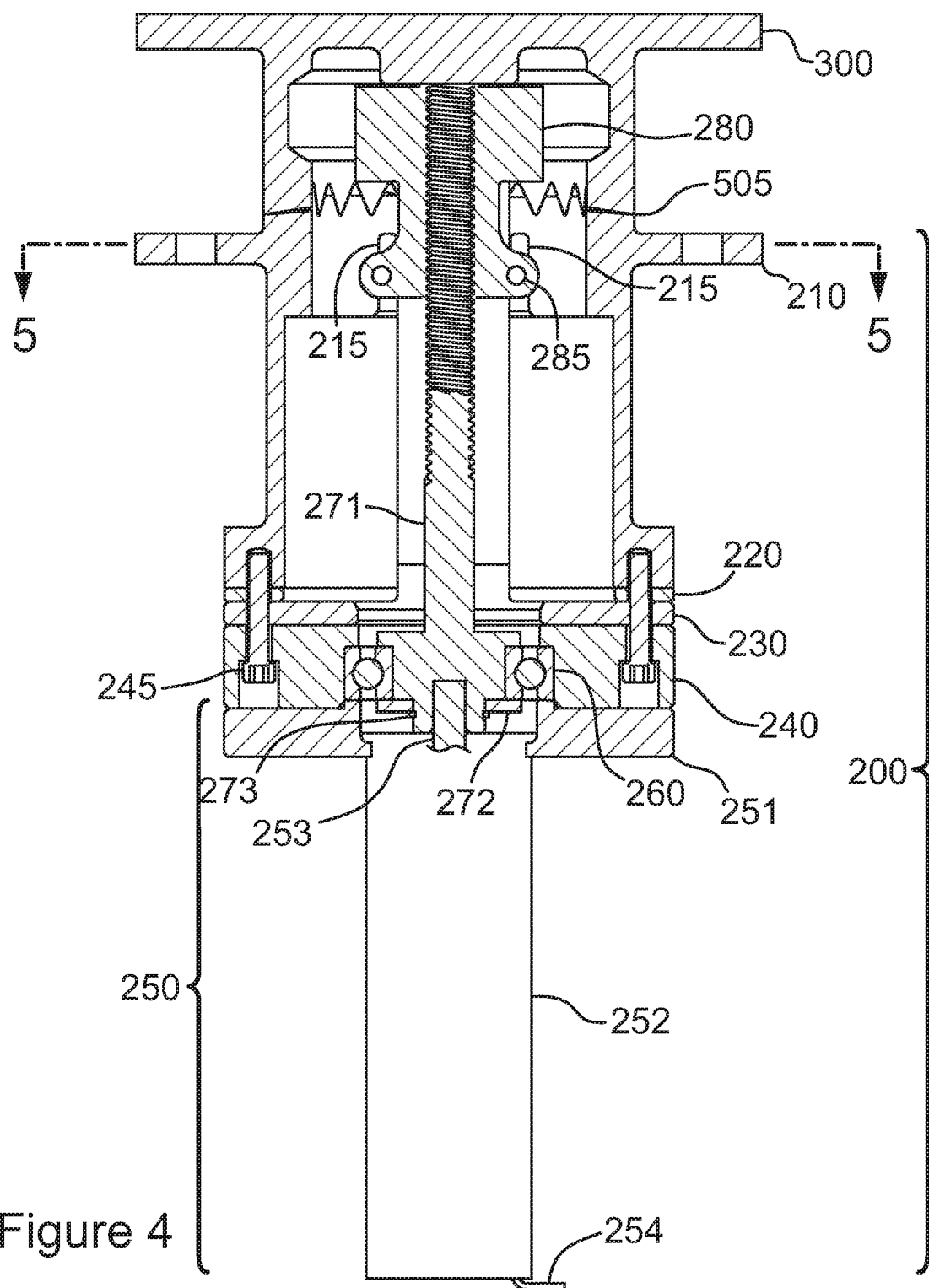
FIG. 4 is a cross section view taken along line 4-4 of FIG. 2 showing further details of the mechanism.

FIG. 4 shows a cross section view taken along line 4-4 of FIG. 2 showing further details of the passive housing 300 and the active housing assembly 200. The active housing assembly components visible include the active housing 210, preload shim 220, collet 230, bearing housing 240, actuator assembly 250, bearing 260, lead screw 271, bearing washer 272, fasteners 245, bearing retainer 273, plunger guides 285 and plunger 280. Actuator assembly 250 comprises actuator plate 251, actuator 252 and actuator harness 254. The interface between passive housing 300 and active housing assembly 200 is shown at 505.

Figure 5:
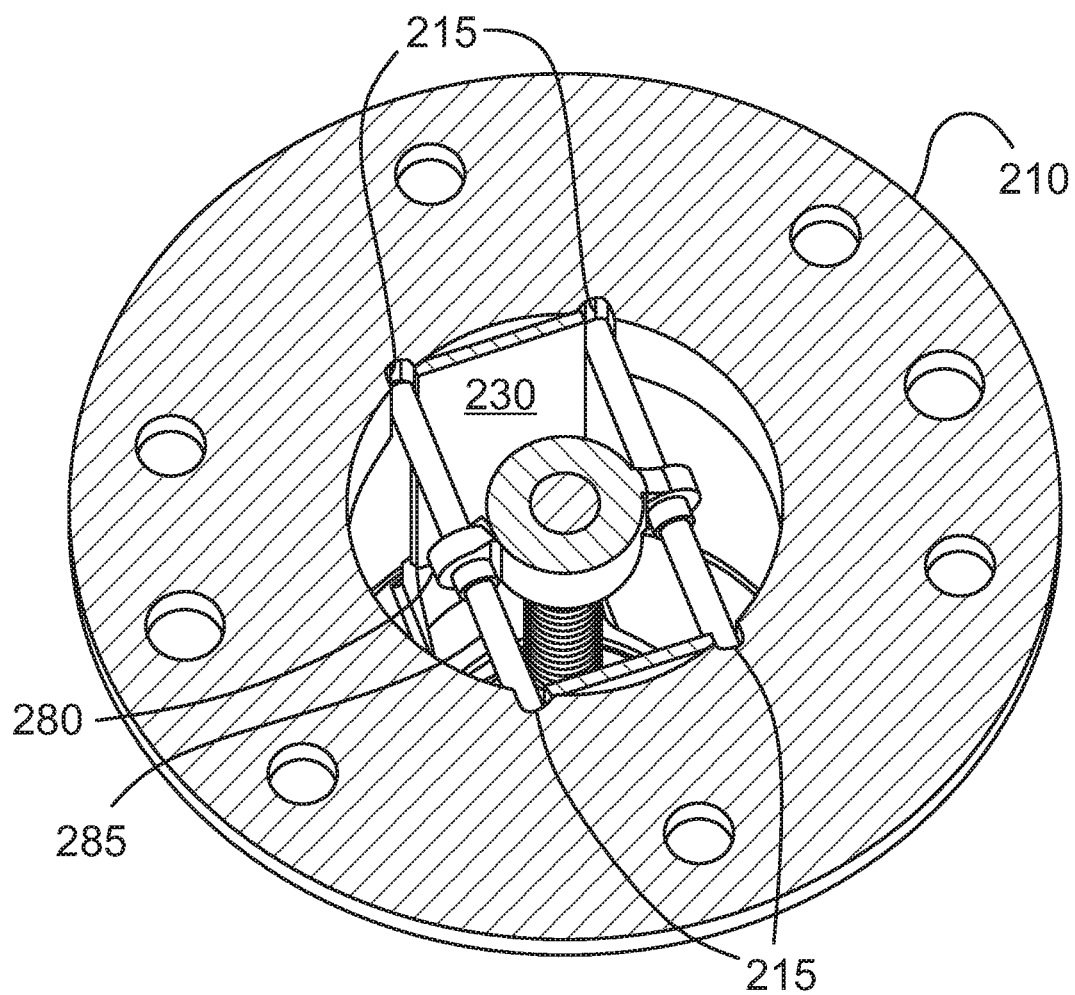
FIG. 5 is a cross section view taken along line 5-5 of FIG. 4.

FIG. 5 shows a cross section view taken along line 5-5 of FIG. 4 showing how the plunger guides 285 are connected to the plunger 280, run in grooves 215 in the active housing 210 and are located on either side of the collet 230.

Figure 6:
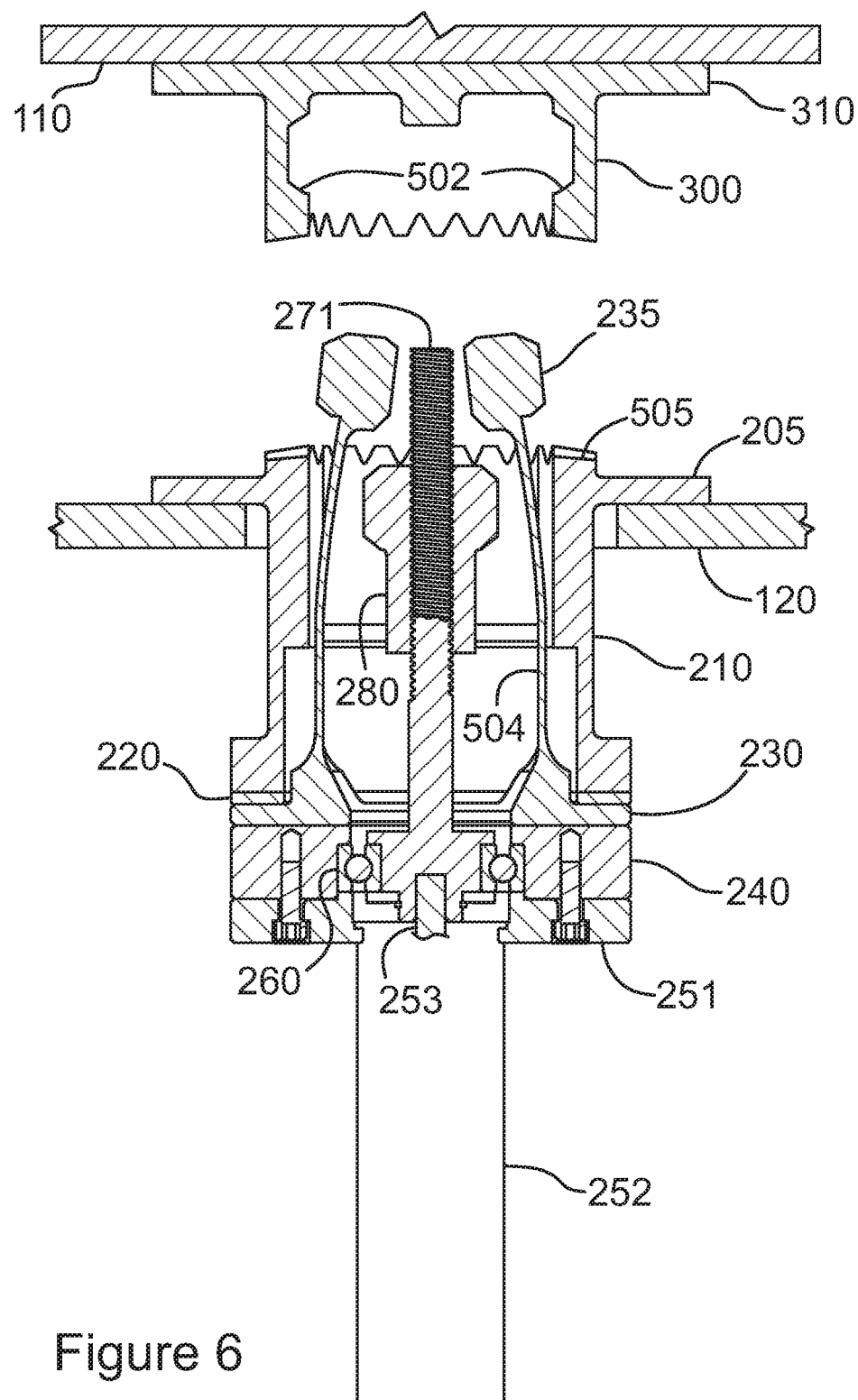
FIGS. 6, 6a, 6b, 6c, 6d and 6e are cross sections along the line 3-3 of FIG. 2 illustrating the sequence of operation of the mechanism.
Figure 6A:
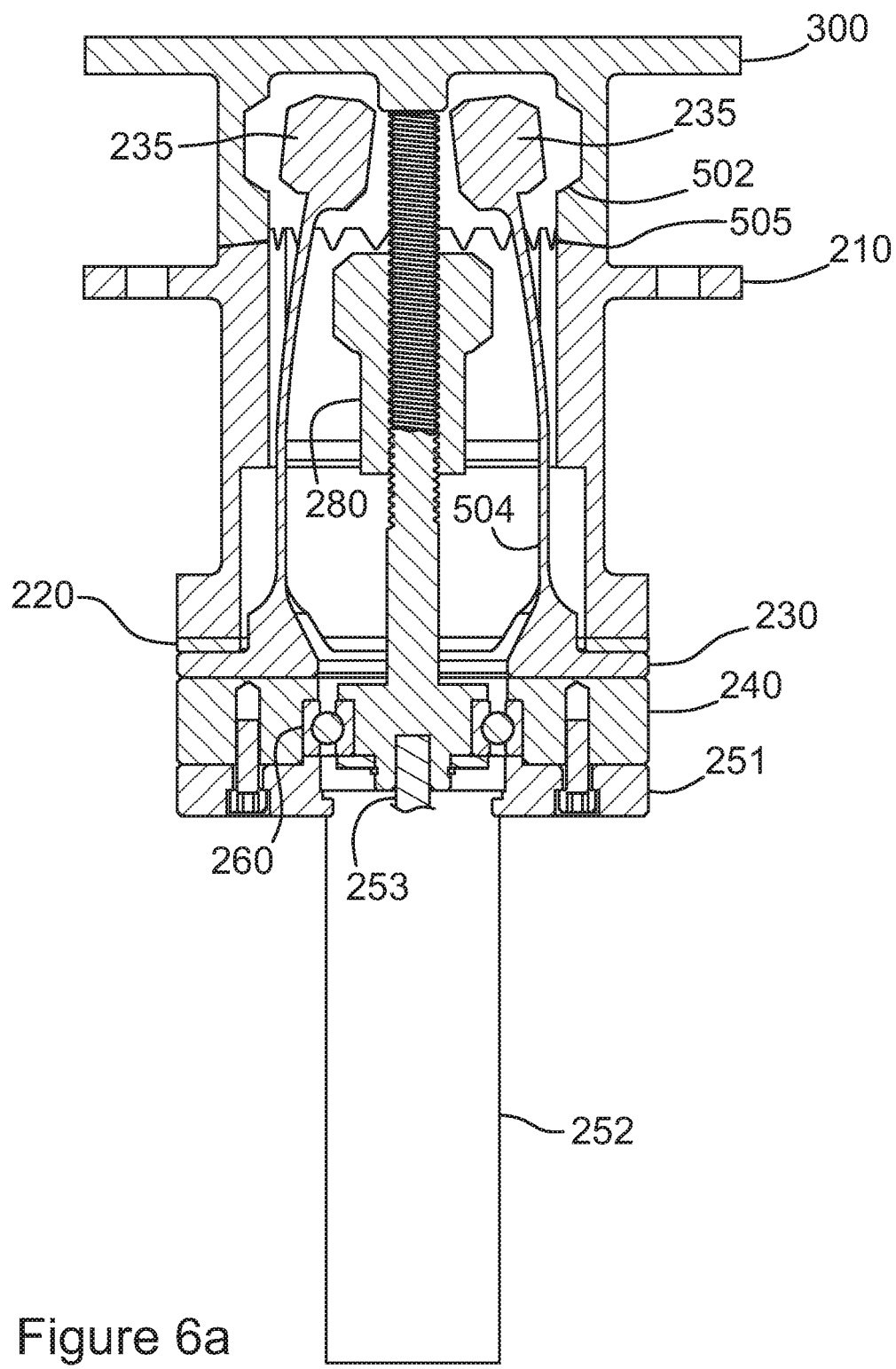
Figure 6B:
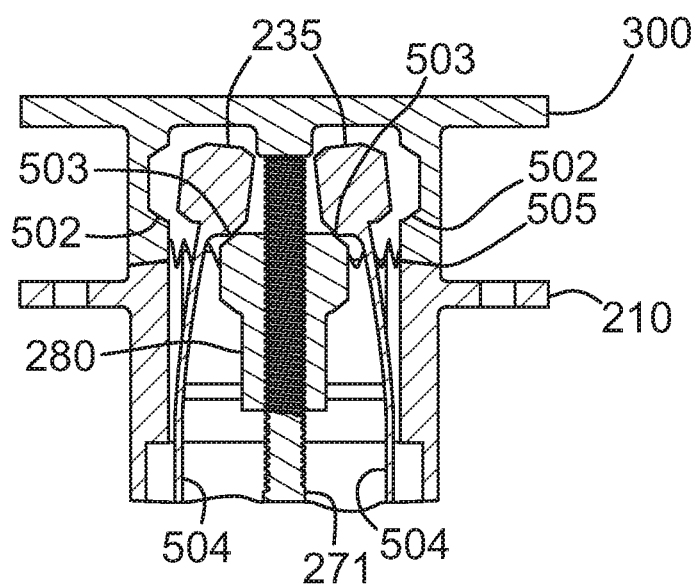
Figure 6C:
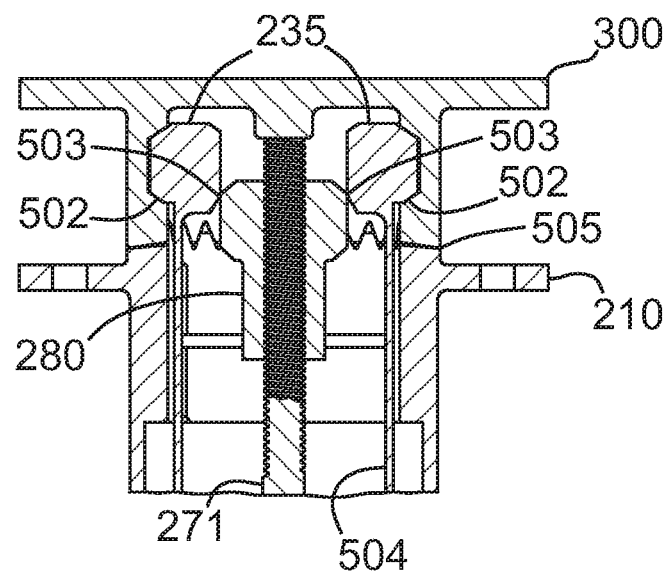
Figure 6D:
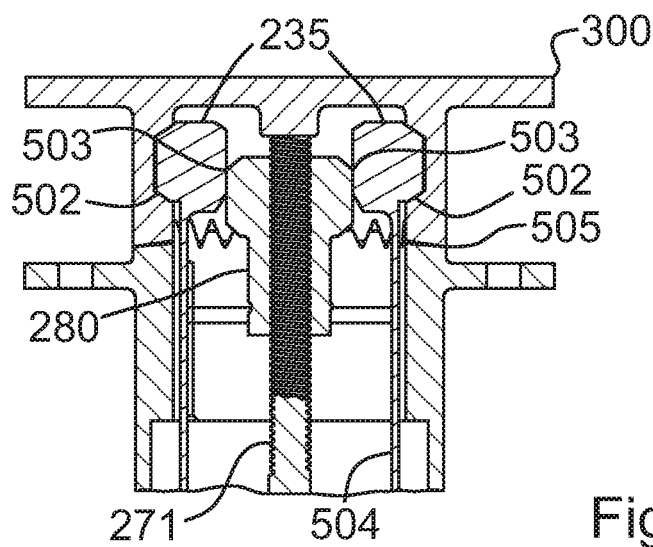
Figure 6E:
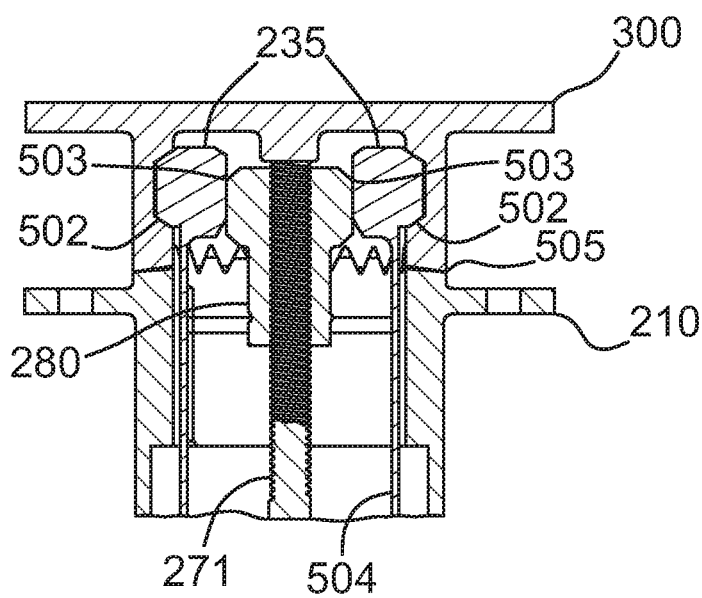

FIGS. 6 through 6e show cross sections along the line 3-3 of FIG. 2 illustrating the sequence of operation of the mechanism showing the passive housing 300 attached to its object 110 via attachment feature 310, the active housing assembly 200, the active housing 210 attached to its object 120 via attachment feature 205, preload shim 220, collet 230, collet wedges 235, collet arms 504, bearing housing 240, actuator plate 251, and actuator 252, bearing 260, lead screw 271, plunger 280, interface 505, contact point 503, and contact surface 502. This figure also illustrates how the separation of the active housing assembly 200 from the passive housing 300 acts to allow two objects, 110 and 120 to be separated if the HDRM is in the "released" state compared to being structurally attached if the HDRM is in the "armed" condition (see FIG. 3).

Figure 7:
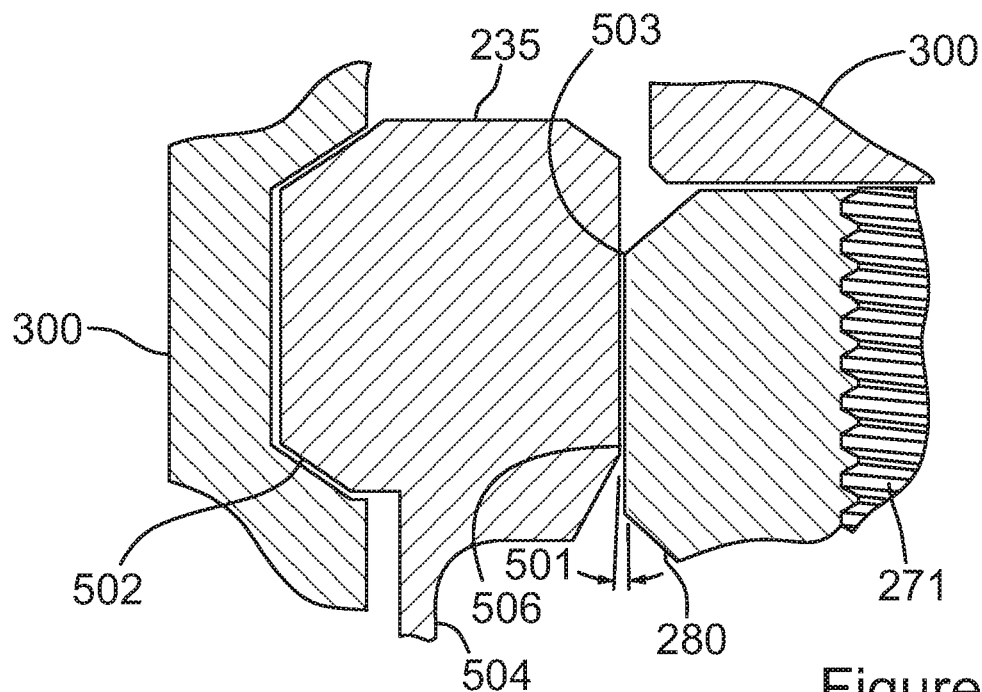
FIG. 7 is a magnified view of detail 7 of FIG. 3.

FIG. 7 is a magnified view of detail 7 of FIG. 3 showing the interaction between the plunger 280, lead screw 271 and the passive housing 300 when the AReS HDRM has achieved the full structural preload. It shows the contact surfaces 502 and contact point 503 and the wedge angle 501.

Figure 8:
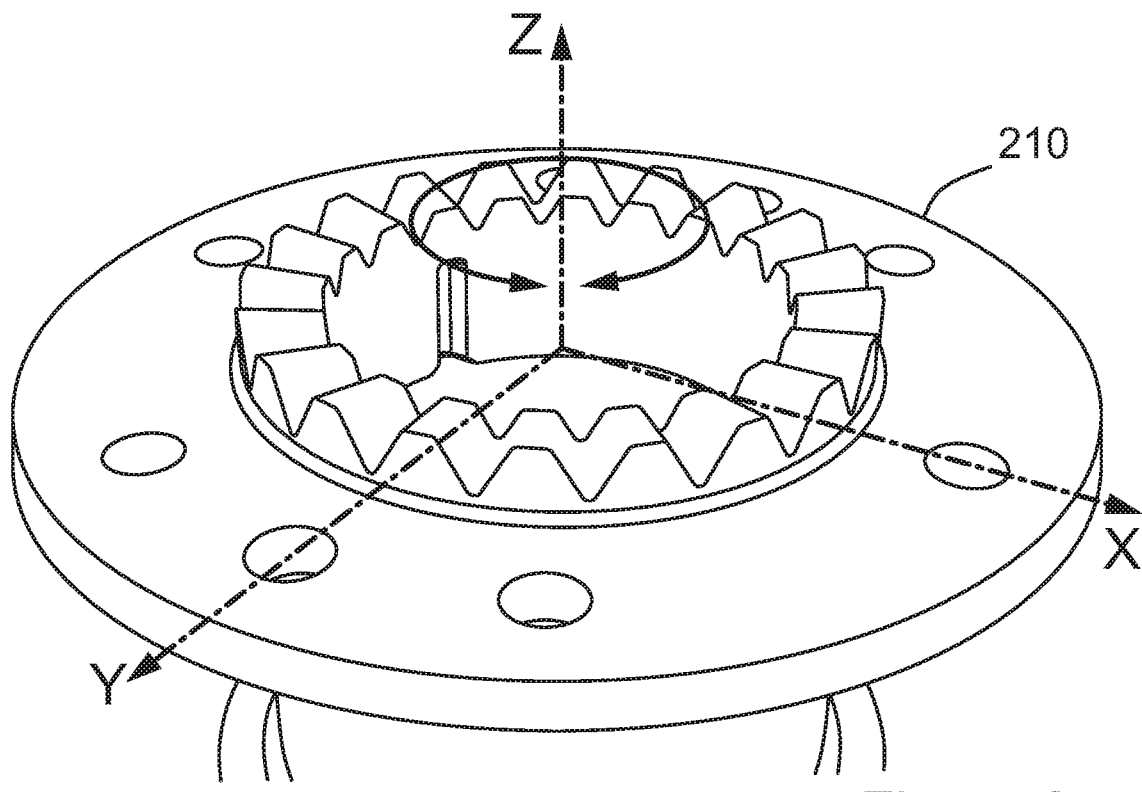
FIG. 8 is a coordinate system where axis Z lies along the axis of the active housing 210 and mutually orthogonal axes X and Y.

FIG. 8 shows a coordinate system where axis Z lies along the axis of the active housing 210 and mutually orthogonal axes X and Y. The orientation of axes X and Y about axis Z is notional and not significant to the operation of the mechanism.

Figure 9:
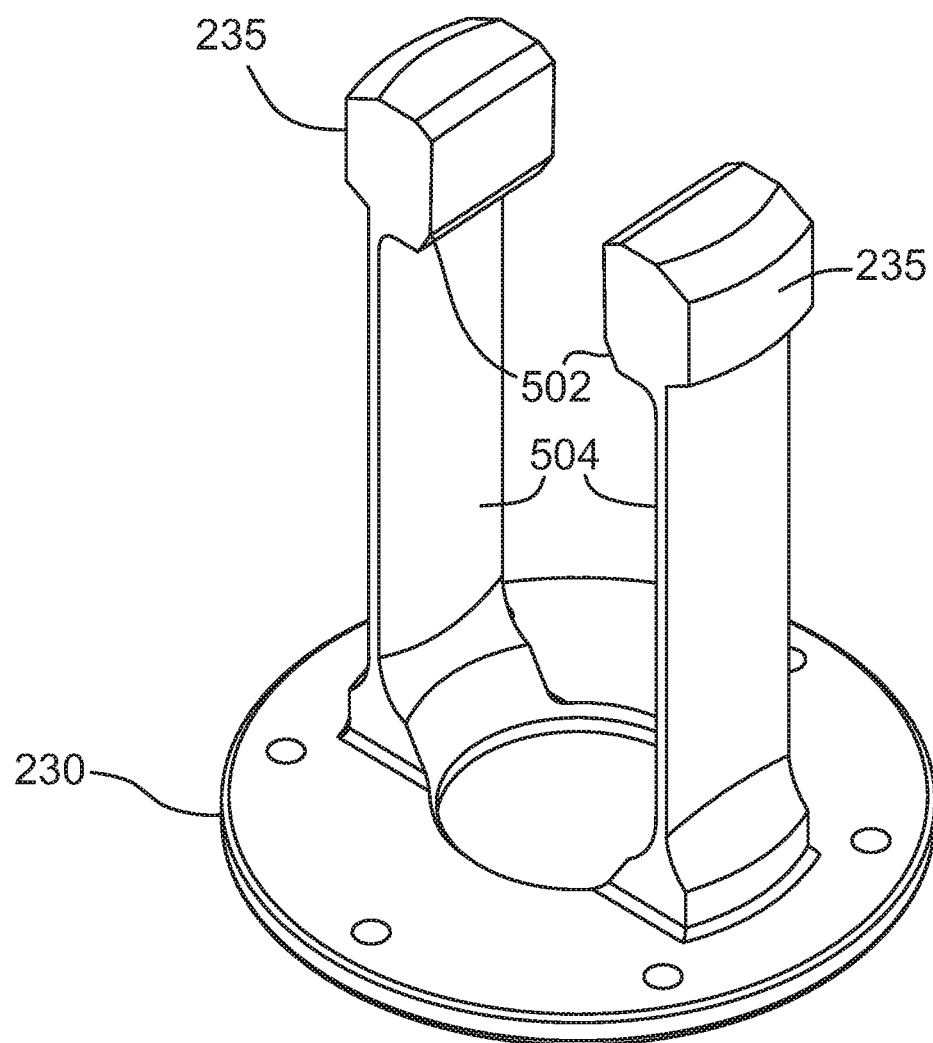
FIG. 9 is an isometric view of the collet in the "armed" state.

FIG. 9 shows an isometric view of only the collet 230 for illustrative purposes. The collet arms 504 are shown in the straightened configuration as if the mechanism was in the "armed" state. Also visible are the collet wedges 235 and the contact surfaces 502 and 506.

Figure 10:
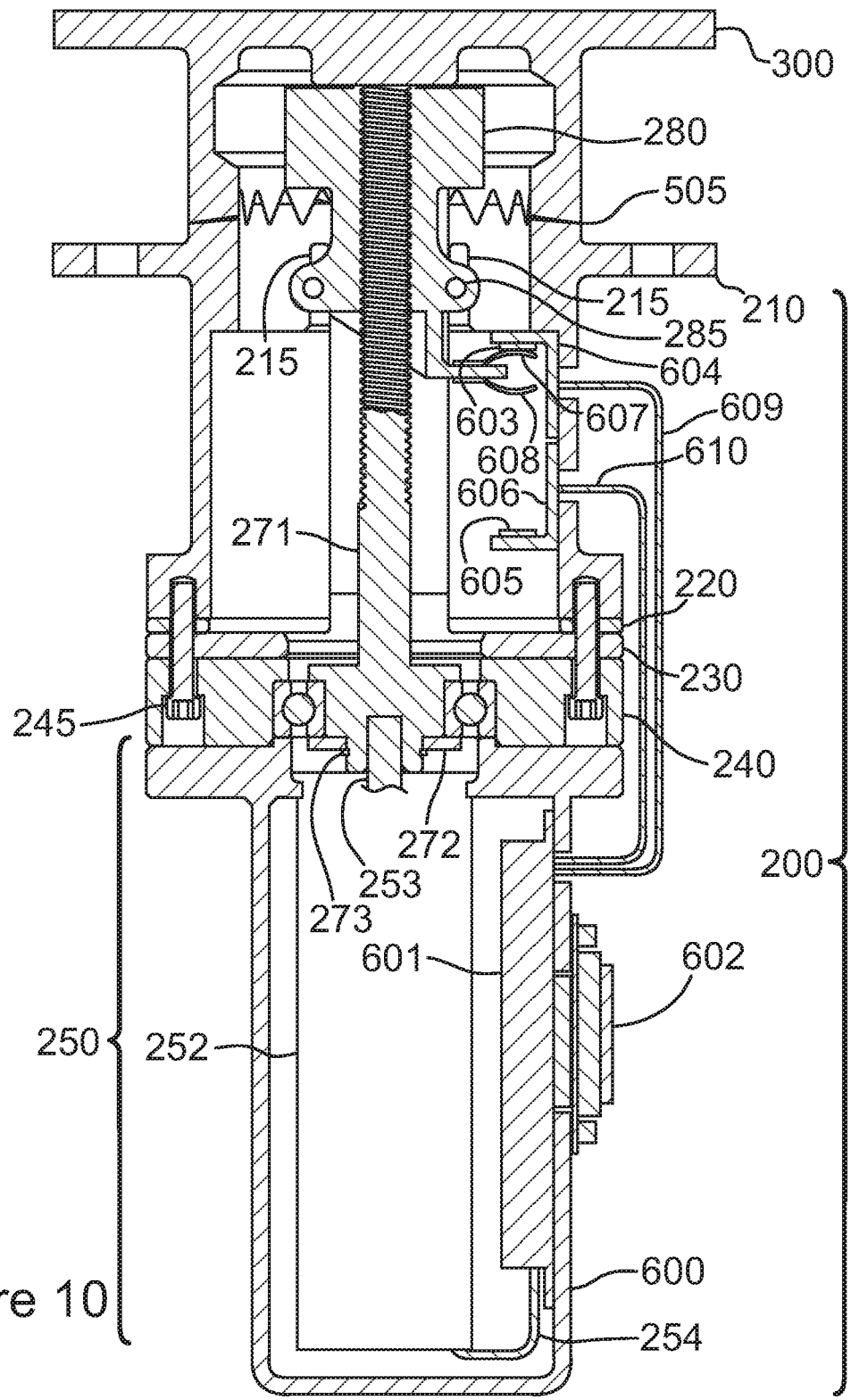
FIG. 10 is a cross section of an alternate embodiment taken along line 4-4 of FIG. 2.

FIG. 10 shows an alternate embodiment and is a repeat of FIG. 4 showing details of the features of the alternate embodiment including the passive housing 300 and the active housing assembly 200. The active housing assembly components visible include the active housing 210, preload shim 220, collet 230, bearing housing 240, actuator assembly 250, bearing 260, lead screw 271, bearing washer 272, fasteners 245, bearing retainer 273, plunger guides 285 and plunger 280. Actuator assembly 250 comprises actuator housing 600, actuator 252, actuator harness 254, avionics board 601, and connector 602. The alternate embodiment also includes "armed" switch surface 603, "armed" switch support 604, "armed" switch contact 607, "released" switch surface 605, "released" switch support 606, "released" switch contact 608, "armed" switch harness 609 and "released" switch harness 610.

Method of Operation

The AReS HDRM device disclosed herein uses the principles of wedges to achieve not only the desired structural preload required to properly support items attached to each portion of the mechanism but also, because no parts are damaged, modified or consumed in the operation of the mechanism, to permit reusability and increased reliability.

The AReS HDRM is used to permit two objects 110 and 120 to be releasably and resettably structurally connected to each other, each portion of the HDRM being attached to one or the other object, 110 or 120. To release the two portions of the mechanism, and thereby release the two objects 110 and 120, they first must be properly attached to each other and the desired preload tension achieved in the collet 230 that will support the required loads that will be applied through the HDRM 100. As shown in FIG. 6 the passive housing 300 starts out separate from the active housing assembly 200. In this configuration, the HDRM 100 state is defined as being "released". The two housings 200 and 300 may be attached to the items to be released at this point or they can be fastened to those items after the HDRM 100 has been preloaded, or "armed". Holes 301 and 210 (see FIG. 1) are provided to mount the mechanism to the two items to be releasably attached. For the sake of clarity of this description, it will be assumed that the preloaded HDRM 100 will be attached to the items to be released after the preload has been achieved. Whether the preload is achieved before or after the HDRM 100 is attached to the two items to be released does not affect the sequence of operations.

Step 1

FIG. 6 shows the two parts of the mechanism prior them being mated. Passive housing 300 attached to its object 110 via attachment feature 310 is completely separate from the active housing assembly 200 with the active housing 210 attached to its object 120 via attachment feature 205. All parts are in their fully "released" state.

Step 2

The first step in preloading the HDRM 100 is to bring the passive housing 300 into contact with the active housing assembly 200 at the mating interface 505, see FIG. 6a. The actuator 252 has not rotated the lead screw 271 at all at this point. In this embodiment the interface 505 is a Hirth coupling, capable of reacting rotational and in-plane loads. These couplings are well known to those skilled in the art. Different embodiments exchange the Hirth coupling interface for different interfaces and will be described below.

Step 3

The actuator 252 is attached to the lead screw 271 through the actuator drive shaft 253 and the lead screw is threaded into the plunger 280. The actuator 252 rotates the lead screw 271 such that it causes the plunger 280 to advance towards the passive housing 300. FIG. 6b illustrates the plunger 280 just at the moment it contacts the collet wedges 235 at the two contact points 503 and prior to any movement of the collet wedges 235. In the released state the collet arms 504 are curved inwards such that the collet wedges 235 are clear of the interior diameter of the passive housing 300.

It is understood that the lead screw 271 may be exchanged for other devices used to convert rotational motion into a linear motion, such as ball screws or a rack and pinion should they be more advantageous for a particular application. Additionally the actuator 252 may be any device capable of providing rotational movement upon command, such as, but not limited to, an electric motor.

Step 4

As shown in FIG. 6c, the plunger 280 continues to be advanced. The contact points 503 between the plunger 280 and the collet wedges 235 change as the plunger 280 is advanced and the orientation of the collet wedges 235 change and rotate as they move radially outward and into the complementary grooves in the passive housing 300. As they move radially outwards, the collet wedges 235 begin to come into contact with the passive housing 300 along surface 502.

Step 5

FIG. 6d shows how the lead screw 271 continues to advance the plunger 280 which forces the collet wedges 235 outwards and further into engagement with the complementary grooves in the interior surface of the passive housing 300 along surface 502. The arms 504 of the collet 230 straighten as the collet wedges 235 are pushed into the grooves in the passive housing 300.

Step 6

A detail of the fully engaged collet wedge 235 is shown in FIG. 7. The continued advancement of the plunger 280 eventually causes the wedge of the collet 230 to contact the passive housing 300 along surface 502, which is inclined. The interior surface 506 of the collet wedge 235 is tapered at predetermined angle 501. This angle 501 is such that as the plunger 280 advances, the collet wedge 235 is pushed outwards and thereby up surface 502 only as far as needed to stretch the collet arms 504 sufficiently to attain the desired preload between the passive housing 300 and the active housing assembly 200.

As the actuator 252 continues to advance the plunger 280, the contact point 503 between the interior wedge surface 506 and the plunger 280 moves to force the collet wedge 235 further into the complementary groove in the passive housing 300. Once full contact has occurred along surface 502, additional advancement of the plunger 280 acts to force the collet wedge 235 further up inclined surface 502 acting to induce tension or preload in the collet arms 504.

Step 7

Once a predetermined advancement of the plunger 280 has been achieved then the desired preload in the collet arms 504 will have also been achieved. FIG. 6e shows the plunger 280 at its fully extended position and the collet wedges 235 in fully engaged with the passive housing 300 along surface 502.

Several methods can be used to establish when the plunger 300 has been advanced sufficiently to achieve the desired preload. These include counting rotations of the lead screw 271, using strain gauges to sense the tension or preload in the collet arms 504 or, as in this embodiment, using a shim 220 coupled with stalling the actuator 252.

As shown in FIG. 4, the actuator 252 is powered and commanded via harness 254, and during the manufacturing process the thickness of shim 220 is adjusted to ensure that when the plunger 280 contacts the underside of the passive housing 300 and causes the actuator 252 to stall, or exceed its current limit, that the collet wedges 235 have been forced up surface 502 sufficiently to generate the required tension in the collet arms 504. Depending upon the desired preload and the materials and methods used to make the passive housing 300, active housing 210 and collet 230, there may not be a need for a separate shim.

To prevent the plunger 280 from rotating prior to contact with the collet wedges 235, the plunger 280 is guided by guide pins 285 that run in grooves 215 in the inner surface of the active housing 210, see FIGS. 4 and 5.

Referring to FIG. 4, lead screw 271 is supported in bearing housing 240 by bearing 260 which is then retained on the shaft of the lead screw 271 by bearing washer 272 and bearing retainer 273. Fasteners 245 are used to hold the bearing housing 240, the collet 230 and the shim 220 to the active housing 210. Fasteners 253 (FIG. 3) are used to hold the actuator assembly 250 to the bearing housing 240.

Once the preload between the passive housing 300 and the active housing assembly 200 has been achieved, the entire HDRM 100 is considered "armed". To change to the "released" state, the preceding operations to achieve the preload are essentially reversed. The actuator 252 is commanded to rotate the plunger 280 in the opposite direction such that the plunger 280 moves away from the passive housing 300. This acts to first release the preload or tension in the collet arms 504 over a period of time lasting several seconds. This release of the preload over time is the key to achieving ultra-low mechanical shock and is the key discriminator between the device disclosed herein and virtually all other release mechanisms.

With the preload released the plunger 280 is moved still further away from the passive housing 300 and without the plunger 280 forcing them apart, the collet wedges 235, pull out of their complementary grooves in the passive housing 300 to the point where the passive housing, 300 may be freely separated from the active housing assembly 200. The HDRM has now returned to the "released" state.

If the passive housing 300 is again placed upon the active housing assembly 200 at the mating interface 505, the HDRM 100 may again be driven to the "armed" state with no additional changes to the mechanism. This ability to repeatedly cycle between the "armed" and "released" states, with the exact same components used each time, is key to the reusable nature of the present capture and release mechanism and is also key to increasing the reliability of the entire assembly because all of the components to be used operationally may be tested prior to operation.

Additional Embodiments

As described above, the interface between the passive housing 300 and the active housing 210 is a Hirth coupling. These couplings provide a structural connection that can react rotational as well as in-plane loads in the plane orthogonal to the axis of the coupling (frequently referred to reacting loads in the X-Y plane and moments about the Z axis, see FIG. 8).

In another embodiment, the interface can be the well-known "cup and cone" design which does not restrict rotation about the Z axis and reacts all other loads and moments.

A further embodiment replaces the Hirth coupling with a slotted plate that permits motion in one direction in a plane and about the Z axis and reacts all other loads and moments.

A further embodiment replaces the Hirth coupling with a plate with a hole larger than the diameter of the collet such that it permits sliding motion in the plane of the plate and rotation about the Z axis but reacts all other loads and moments.

Release may be controlled or triggered by an automatic command from the spacecraft control computer at a specified point in the operation plan, with the AReS release triggered through spacecraft data bus connection from the spacecraft computer. Alternatively, triggering of the release can occur from an operator command from the ground. This command is provided at a ground station, which via a communication link to the spacecraft computer allows the triggering of the AReS.

The physical action of coupling the passive and active portions of the AReS can be done manually, or an assembly rig can be used to offer the payload with passive housing attached up to the active assembly to mate the two interfaces.

A further embodiment permits the AReS HDRM to be backwards compatible with any spacecraft control system that provides only a short firing pulse for releasing standard pyrotechnic release mechanisms. Additional features of this embodiment are sensors to establish when the plunger is in the "armed" or "released" state, avionics that interpret the pulse provided by the spacecraft and use that pulse, plus the signals returned from the sensors, to controllably apply power to the actuator to drive the mechanism. The advantage of this embodiment is that it permits the AReS HDRM to be used with spacecraft control systems that are already configured to accommodate pyrotechnic release mechanisms without requiring a change to those control systems, providing easy integration of the AReS HDRM with legacy spacecraft control systems.

As shown in FIG. 10, the plunger 280 incorporates features to support the "armed" switch contact 607 and the "released" switch contact 608. When the AReS HDRM is in the "armed" state, as shown in FIG. 10, the "armed" switch contact 607 is in electrical contact with the "armed" switch surface 603, structurally supported on the "armed" switch support 604, it closes a circuit providing a signal to the avionics board 601, within the actuator housing 600, via the "armed" switch harness 609.

When the signal to release the HDRM is received from the spacecraft via the connector 602, the avionics board 601 is configured to apply electrical power, also supplied from the spacecraft via connector 602, to the actuator 252 thereby moving the plunger 280. As the plunger 280 retracts, the "armed" switch contact 607 electrically separates from the "armed" switch surface 603 breaking the circuit in the "armed" switch harness 609. The avionics board 601 uses this to sense that the plunger 280 is retracting and continues to apply power to the actuator 252 until the "retracted" switch contact 608 comes into electrical contact with the "retracted" switch surface 605, supported on "retracted" switch support 606, closing a circuit in the "retracted" switch harness 610 which signals to the avionics board 601 that the plunger 280 is fully retracted and the active housing assembly 200 has released the passive housing 300. The avionics board 601 then ceases to supply power to the actuator 252 and the motion of the plunger 280 ceases. As per descriptions above, with the plunger 280 retracted, the collet 230 has released the passive housing 300 and the two portions of the AReS HDRM may now separate.

It will be understood that other sensors may be used to establish the position of the plunger 280 and report it to the avionics board 601, such as potentiometers, resolvers, microswitches, etc.

Due to the resettable nature of the mechanism a further embodiment uses the mechanism as a releasable structural fastener for environments where using conventional fasteners may not be possible. In such environments, possibly outer space or within a nuclear reactor, as examples, the active housing assembly 200 and the passive housing assembly 300 may be affixed to items that have never previously been mated and, due to human or robotic means, are mated for the first time within the environment. Actuation of the mechanism to the armed state will form a structural attachment between the two items. In this way the AReS may be used to stow items within the environment or used to assemble multiple items together for use in that environment as a larger assemblage.

In this embodiment, the remote coupling of the active and passive housing assemblies 200 and 300 could be enabled by a positioning device (for example a robotic arm/manipulator) and sensors mounted on one or both of housings 200 and 300. The positioning device could be used to position and mate an object 110 to a second object 120, by positioning and mating the passive housing assembly 300 already attached to 110 on to the active housing assembly 200 already attached to 120. In an alternate embodiment, the positioning device is used to position and mate an object 120 to a second object 110, by positioning and mating the active housing assembly 200 already attached to 120 on to the passive housing assembly 300 already attached to 110. Positioning the passive housing assembly 300 with respect to the active housing assembly 200 (or active housing assembly 200 with respect to passive housing assembly 300 with sufficient accuracy to permit mating may be accomplished in several ways, which include, but are not limited to autonomous control of the positioning device by a computer control system or human-in-the-loop command from a remote location, possibly using communication with a ground station, using various sensors that may include cameras, radar or LIDAR.

It will be also understood that although the passive housing 300 and active housing 210 have been shown as components separate from the items to be released, the operable features of the passive housing 300 and active housing 210 can be manufactured integral with one or the other or both items to be released providing a further benefit from reduced overall mass.

The foregoing description of the preferred embodiments of the disclosure has been presented to illustrate the principles of the disclosure and not to limit the disclosure to the particular embodiment illustrated. It is intended that the scope of the disclosure be defined by all of the embodiments encompassed within the following claims and their equivalents.

Therefore what is claimed is:

1. A system for positioning and mating together first and second objects, comprising:
   a) a robotic arm, said first object being configured to be positioned by said robotic arm during operations to mate said first object to said second object;
   b) an active housing forming a first part of a resettable and shockless hold-down and release mechanism, said active housing having a distal end which includes an attachment feature attached to said first object, said active housing having a first interface, a locking mechanism mounted in said active housing which includes engagement members extending beyond said first interface, said active housing having one or more sensors mounted thereon; and
   c) a passive housing forming a second part of the resettable and shockless hold-down and release mechanism, said passive housing having a distal end which includes an attachment feature attached to the second object, the passive housing having a second interface complimentary to said first interface to form a coupling between it and said first interface of the passive housing to give a structural connection between said active and passive housings, said passive housing being configured to receive therein said engagement members when a structural connection is formed between said active and passive housings, said passive housing having an internal structure complimentary to said engagement members, said locking mechanism including a reversible drive mechanism which, upon establishment of said structural connection, is configured to drive said engagement members radially outwards into physical contact with said internal structure thereby locking said active and passive housing assemblies together in a shockless manner, and reversing said drive mechanism causes said engagement members to physically disengage from said complimentary internal housing structure to release said active and passible housing assemblies from each other in a shockless manner; and
   d) a control system connected to the robotic arm and said one or more sensors, said control system being programmed for controlling the robotic arm based on feedback from said one or more sensors for all activities associated with aligning, coupling and decoupling the active housing already attached to said second object with respect to the passive housing already attached to the first object.

2. The system according to claim 1, wherein said one or more sensors are any one or combination of cameras, camera-based vision system, radars and LIDAR.

3. The system according to claim 1, wherein said control system includes a computer control system configured for autonomous control of the robotic arm by said computer control system.

4. The system according to claim 1, wherein said control system is configured to receive human-in-the-loop commands from a remote location.

5. The system according to claim 1, wherein said remote location is a ground station.

6. The system according to claim 1, wherein the first object is a spacecraft payload and wherein the second object is a spacecraft.

7. The system according to claim 1, wherein the first object is a spacecraft payload and wherein the second object is a spacecraft.

8. The system according to claim 1, wherein said control system is configured for control of the positioning device by any one of an autonomous computer control system or human-in-the-loop command from a remote location by communication with a ground station, and sensor feedback associated with said robotic arm.

9. A system for positioning and mating together first and second objects, comprising:
   a) an active housing forming a first part of a resettable and shockless hold-down and release mechanism, said active housing having a distal end which includes an attachment feature attached to said first object, said active housing having a first interface, a locking mechanism mounted in said active housing which includes engagement members extending beyond said first interface, said active housing having one or more sensors mounted thereon;
   b) a robotic arm, said second object being configured to be positioned by said robotic arm during operations to mate said second object to said first object;
   c) a passive housing forming a second part of the resettable and shockless hold-down and release mechanism, said passive housing having a distal end which includes an attachment feature attached to the second object, the passive housing having a second interface complimentary to said first interface to form a coupling between it and said first interface of the passive housing to give a structural connection between said active and passive housings, said passive housing being configured to receive therein said engagement members when a structural connection is formed between said active and passive housings, said passive housing having an internal structure complimentary to said engagement members, said locking mechanism including a reversible drive mechanism which, upon establishment of said structural connection, is configured to drive said engagement members radially outwards into physical contact with said internal structure thereby locking said active and passive housing assemblies together in a shockless manner, and reversing said drive mechanism causes said engagement members to physically disengage from said complimentary internal housing structure to release said active and passible housing assemblies from each other in a shockless manner, said passive housing having one or more sensors mounted thereon; and
   d) a control system connected to the robotic arm and said one or more sensors, said control system being programmed for controlling the robotic arm based on feedback from said one or more sensors for all activities associated with aligning, coupling and decoupling the passive housing already attached to said second object with respect to the active housing already attached to first object.

10. The system according to claim 9, wherein said one or more sensors are any one or combination of cameras, camera-based vision system, radars and LIDAR.

11. The system according to claim 9, wherein said control system includes a computer control system configured for autonomous control of the robotic arm by said computer control system based on feedback from said one or more sensors.

12. The system according to claim 9, wherein said control system is configured to receive human-in-the-loop commands from a remote location based on feedback from said one or more sensors.

13. The system according to claim 12, wherein said remote location is a ground station.

14. The system according to claim 9, wherein the first object is a spacecraft and wherein the second object is a spacecraft payload.

15. The system according to claim 9, wherein the first object is a spacecraft payload and wherein the second object is a spacecraft.

16. The system according to claim 9, wherein said control system is configured for control of the positioning device by any one of an autonomous computer control system or human-in-the-loop command from a remote location by communication with a ground station, and sensor feedback associated with said robotic arm.

17. A system for positioning and mating together first and second objects, comprising:
   a) a first robotic arm, said first object being configured to be positioned by said robotic arm during operations to mate said first object to said second object;
   b) an active housing forming a first part of a resettable and shockless hold-down and release mechanism, said active housing having a distal end which includes an attachment feature attached to said first object, said active housing having a first interface, a locking mechanism mounted in said active housing which includes engagement members extending beyond said first interface, said active housing having one or more sensors mounted thereon;
   c) a second robotic arm, said second object being configured to be positioned by said second robotic arm during operations to mate said second object to said first object;
   d) a passive housing forming a second part of the resettable and shockless hold-down and release mechanism mounted to said second robotic arm, the passive housing having a distal end which includes an attachment feature attached to the second object, the passive housing having a second interface complimentary to said first interface to form a coupling between it and said first interface of the passive housing to give a structural connection between said active and passive housings, said passive housing being configured to receive therein said engagement members when a structural connection is formed between said active and passive housings, said passive housing having an internal structure complimentary to said engagement members, said locking mechanism including a reversible drive mechanism which, upon establishment of said structural connection, is configured to drive said engagement members radially outwards into physical contact with said internal structure thereby locking said active and passive housing assemblies together in a shockless manner, and reversing said drive mechanism causes said engagement members to physically disengage from said complimentary internal housing structure to release said active and passible housing assemblies from each other in a shockless manner, said passive housing having one or more sensors mounted thereon; and d) a control system connected to said first and second robotic arms and said one or more sensors on said passive and active housings, said control system being programmed for controlling the first and second robotic arms based on feedback from said one or more sensors on said passive and active housings for all activities associated with aligning, coupling and decoupling the active and passive housings.

18. The system according to claim 17, wherein said one or more sensors are any one or combination of cameras, camera-based vision system, radars and LIDAR.

19. The system according to claim 17, wherein said control system includes a computer control system configured for autonomous control of the robotic arm by said computer control system.

20. The system according to claim 17, wherein said control system is configured to receive human-in-the-loop commands from a remote location.

21. The system according to claim 20, wherein said remote location is a ground station.

22. The system according to claim 17, wherein the first object is a spacecraft and wherein the second object is a spacecraft payload.

23. The system according to claim 17, wherein the first object is a spacecraft payload and wherein the second object is a spacecraft.

24. The system according to claim 17, wherein said control system is configured for control of the positioning device by any one of an autonomous computer control system or human-in-the-loop command from a remote location by communication with a ground station, and sensor feedback associated with said robotic arm.

* * * * *